United States Patent
Doerr et al.

(10) Patent No.: US 9,721,318 B2
(45) Date of Patent: Aug. 1, 2017

(54) METHOD FOR WATERMARKING A THREE DIMENSIONAL OBJECT AND METHOD FOR OBTAINING A PAYLOAD FROM A THREE DIMENSIONAL OBJECT

(71) Applicant: THOMSON LICENSING, Issy de Moulineaux (FR)

(72) Inventors: Gwenael Doerr, Rennes (FR); Xavier Rolland-Neviere, Marcq-en-Baroeul (FR); Pierre Alliez, Le Chesnay (FR)

(73) Assignee: Thomson Licensing, Issy-les-Moulineaux (FR)

( * ) Notice: Subject to any disclaimer, the term of this patent is extended or adjusted under 35 U.S.C. 154(b) by 157 days.

(21) Appl. No.: 14/839,973

(22) Filed: Aug. 29, 2015

(65) Prior Publication Data

US 2016/0063661 A1 Mar. 3, 2016

(30) Foreign Application Priority Data

Aug. 29, 2014 (EP) .................... 14306339

(51) Int. Cl.
*G06K 9/00* (2006.01)
*G06T 1/00* (2006.01)
(Continued)

(52) U.S. Cl.
CPC .......... *G06T 1/0092* (2013.01); *G06T 1/0028* (2013.01); *G06T 1/0064* (2013.01);
(Continued)

(58) Field of Classification Search
CPC ... G06T 1/0092; G06T 1/0028; G06T 1/0064; G06T 2201/0051; G06T 2201/0083;
(Continued)

(56) References Cited

U.S. PATENT DOCUMENTS

| | | | |
|---|---|---|---|
| 7,817,817 B2 | 10/2010 | Wu et al. | |
| 8,610,709 B2 * | 12/2013 | Choi | G06T 1/0028 345/419 |
| 2015/0170313 A1 * | 6/2015 | Rolland-Neviere | G06K 9/4642 382/100 |

FOREIGN PATENT DOCUMENTS

| | | |
|---|---|---|
| CN | 103247017 | 8/2013 |
| CN | 102622721 | 1/2014 |

OTHER PUBLICATIONS

Barni et al: "Digital watermarking of 3D meshes", Proceedings of SPIE, vol. 5208, Jan. 28, 2004, pp. 68-79.
(Continued)

*Primary Examiner* — Shefali Goradia
(74) *Attorney, Agent, or Firm* — Myers Wolin, LLC (57) ABSTRACT

A method for watermarking a three-dimensional object is disclosed. The watermarking method comprises computing shape descriptor of a local neighborhood of a current vertex among the plurality of vertices of the three-dimensional object; obtaining a target shape descriptor from the shape descriptor using a quantization grid associated with a watermark payload; and modifying said local neighborhood wherein a position of at least one vertex of said local neighborhood is modified such that a shape descriptor of said modified local neighborhood is close to said target shape descriptor and wherein said current vertex is not modified.

A method for obtaining payload from a three-dimensional object, a 3D object carrying a watermark and devices implementing the disclosed methods are further disclosed.

17 Claims, 5 Drawing Sheets

(51) Int. Cl.
H04N 19/124 (2014.01)
H04N 19/136 (2014.01)
H04N 19/467 (2014.01)
H04N 19/597 (2014.01)
H04N 13/00 (2006.01)

(52) U.S. Cl.
CPC ....... *H04N 13/0048* (2013.01); *H04N 19/124* (2014.11); *H04N 19/136* (2014.11); *H04N 19/467* (2014.11); *H04N 19/597* (2014.11); *G06T 2201/0051* (2013.01); *G06T 2201/0083* (2013.01)

(58) Field of Classification Search
CPC .. H04N 19/124; H04N 19/136; H04N 19/467; H04N 19/597; H04N 13/0048
See application file for complete search history.

(56) References Cited

OTHER PUBLICATIONS

Wang et al: "A comprehensive survey on three-dimensional mesh watermarking", IEEE Transactions on Multimedia, IEEE Service Center, vol. 10, n°8, Dec. 1, 2008, pp. 1513-1527.

Rondao Alface et al: "From 3D mesh data hiding to 3D shape blind and robust watermarking: A survey", Jan. 1, 2007, Transactions on Data Hiding and Multimedia Security II, pp. 91-115.

Motwani et al: "Using radial basis function networks for watermarks determination in 3D models", 2009 Annual IEEE India Conference (INDICON 2009); pp. 1-4.

Weng et al: "A fragile watermarking algorithm for T-Spline surfaces", 2009 IEEE Youth Conference on Information, Computing and Telecommunication (YC-ICT 2009); pp. 546-549.

Chen et al: "Quantization Index Modulation Methods for Digital Watermarking and Information Embedding of Multimedia", J. VLSI Signal Process. Syst., vol. 27, pp. 7-33, 2001.

Sun et al: "A Concise and Provably Informative Multi-scale Signature Based on Heat Diffusion", Proceedings of the Symposium on Geometry Processing, 2009; vol. 28, No. 5, pp. 1-11.

Rondao-Alface et al: "Blind watermarking of 3D meshes using robust feature points detection", IEEE International Conference on Image Processing, 2005; pp. 1-4.

Sipiran et al: "Harris 3D: a robust extension of the Harris operator for interest point detection on 3D meshes", The Visual Computer: International Journal of Computer Graphics, vol. 27, No. 11, pp. 963-976, 2011.

Cazals et al: "Estimating Differential Quantities Using Polynomial Fitting of Osculating Jets", Proceedings of the 2003 Eurographics/ ACM SIGGRAPH Symposium on Geometry Processing, 2003; pp. 1-35.

Search Report Dated Mar. 6, 2015.

* cited by examiner

METHOD FOR WATERMARKING A THREE DIMENSIONAL OBJECT AND METHOD FOR OBTAINING A PAYLOAD FROM A THREE DIMENSIONAL OBJECT

This application claims the benefit, under 35 U.S.C. §119 of European Patent Application No. 14306339.4, filed Aug. 29, 2014.

TECHNICAL FIELD

In the following, watermarking of three-dimensional object is addressed. Specifically, a method for watermarking a three-dimensional object and a method for obtaining a payload from a three-dimensional object are disclosed. The corresponding 3D object, devices and computer program are also disclosed.

BACKGROUND ART

This section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

The feature points of a surface mesh, wherein a 3D object is represented by such mesh, are defined as the locations where the parameters of a fitted local model (referred to as the "signature") reach some extreme values (or more generally are close to some specific values). In other words, by locally fitting a parametric model on the surface, one can establish a mapping from the spatial domain (surface of the object in $\mathbb{R}^3$) to the parameter space (whose dimension equates the number of parameters in the model), where the feature points are located in a subspace of the parameter space. Popular parametric models include quadric models (sphere, paraboloid, ellipsoid . . . ), and more complex ones.

In the context of surface mesh watermarking, feature points are usually introduced as landmarks to create a canonical partitioning of the mesh prior to watermark insertion/extraction as disclosed for instance in P. Rondao-Alface and B. Macq in "*Blind watermarking of 3D meshes using robust feature points detection*" (IEEE International Conference on Image Processing, 2005). They disclosed a method that is advantageously robust against cropping since the payload is repeatedly embedded in each element of the partition. However defining a cropping-invariant partitioning mechanism for 3D meshes represents a complex task. Besides the location of these landmarks is content-dependent and usually relies on umbilical points or mesh prongs, i.e. feature points that are uncontrollable and noticeable. In other words, the location of the feature points is public knowledge and an adversary could target the attacks on these very points of the mesh.

In "*Digital watermarking of 3D meshes*" (Proceedings of SPIE Vol. 5208), Barni et al. disclose a blind watermarking algorithm for 3D meshes. Watermarking is achieved by perturbing the position of the vertices of a low resolution version of the mesh according to a spherical pseudo-random bumped surface. The pseudo-random position and amplitude of the bumps encode the watermark. However, at the detection, the technique of Barni raises the issue of synchronizing the spherical pseudo-random bumped surface with the low resolution model.

In "*A Comprehensive Survey on Three-Dimensional Mesh Watermarking*" (in IEEE TRANSACTIONS ON MULTIMEDIA, December 2008) Wang et al. presents a comprehensive survey on 3-D mesh watermarking covering an introduction to the relevant state of the art, an attack-centric investigation, and a list of existing problems and potential solutions. First the survey at most discloses perspective in the domain of watermarking with shape descriptor and secondly the survey fails to disclose a 3D-watermarking method on based on arbitrarily-chosen vertices.

Thus a method for watermarking a 3D object based on arbitrarily-chosen vertices is therefore needed. To preserve the quality of the 3D object, these watermarked points should also be imperceptible.

SUMMARY

The purpose of the present principles is to overcome at least one of the disadvantages of prior art by proposing a method for watermarking a three-dimensional object by modifying a local neighborhood of any vertex of the three-dimensional object.

A salient idea of the present principles is to propose a watermarking technique that relies on the creation of feature points, whose characteristics are dependent of a secret key and of the watermark payload to embed. More generally, the present principles propose to introduce feature points at any given location on a 3D object. Thus, from a point selected arbitrarily on the surface of the object, the algorithm then considers the local neighborhood around this point and assesses its signature according to some parametric model. For the sake of simplicity, let us assume that the surface is locally approximated by a sphere characterized by its radius. Using state-of-the-art watermarking techniques, e.g. a binning scheme with a key-seeded pseudo-random dither, the algorithm computes a target value for the radius based on the watermark payload. Eventually, an optimization process is launched so that the positions of the vertices of the local neighborhood are modified so that (i) the fitting algorithm outputs the expected target value and (ii) the distortion is minimized.

At the receiver side, the algorithm computes, for each vertex on the surface, the value of the different parameters of the parametric model. The algorithm then identifies the vertices which have parameter values closest to the target ones that could be produced by the embedding mechanism, thus leading to blind recovery of the embedding sites using the shared secret key. For instance, the algorithm can isolate the vertices whose parameter values are close to the quantization grid used for watermarking. The watermark information can then be extracted from the parameter values of the parametric model at these locations.

To that end, a method for watermarking a three-dimensional object is disclosed wherein the three-dimensional object is represented by a plurality of vertices. The watermarking method comprises:

Computing an original signature of a local neighborhood of a current vertex among the plurality of vertices wherein the local neighborhood comprises the current vertex and at least one other vertex;

Obtaining a target signature from the original signature and a watermark payload;

Modifying the local neighborhood wherein a position of at least one vertex of the local neighborhood is modified such that the modified signature of the modified local neighborhood is close to the target signature and such that at least one vertex of the local neighborhood is not modified.

The vertex whose neighborhood has been modified, is a landmark which differs from previously introduced feature points in that its signature (also seen as a shape descriptor or more generally as geometrical characteristics) is not an extrema but rather approximatively aligned with a secret signature. Such landmarks are advantageously less perceptible, easier to create and placed at any location in the 3D object.

In a first variant, the local neighborhood comprises vertices in a two ring around said current vertex. In a second variant, the local neighborhood comprises vertices whose geodesic distance from the current vertex is lower than a threshold.

In a preferred embodiment, a signature of a local neighborhood is obtained from parameter values of a parametric model fitted to the local neighborhood. In a variant of the preferred embodiment, the parametric model is a paraboloid and the signature comprises a function of coefficients of the parametric model.

According to a particularly advantageous characteristic, local neighborhood is modified by adding a displacement to the position of at least one vertex, the displacement being such that the modified signature of modified local neighborhood is close to the target signature while minimizing distortion.

According to a particular embodiment, the steps of the watermarking method are applied to a first local neighborhood of the current vertex; and the steps of the watermarking method are applied to a second local neighborhood of the current vertex, wherein modifying the second local neighborhood is such that at least all vertices of the second local neighborhood belonging to the first local neighborhood are not modified.

According to a particular embodiment, the method further comprises selecting a set of current vertices of the three-dimensional object whose local neighborhoods do not overlap and wherein the steps of the watermarking method are applied to each current vertex. Thus the watermark payload is no longer embedded in the whole mesh, but repeated in multiple landmark points. This embodiment advantageously improves the robustness of 3D watermarking against cropping.

In a second aspect, a method for obtaining a payload from a three-dimensional object is disclosed, wherein the three-dimensional object is represented by a plurality of vertices, wherein the signature of a local neighborhood of at least one vertex among the plurality of vertices is close to a target signature and wherein the target signature is obtained using an original signature corresponding to an original three-dimensional object and using a watermark payload. The method comprises:

Computing the signature of the local neighborhood of at least a vertex;

Obtaining a watermark payload using said signature. According to a variant a secret key is further used to obtain the target signature at the embedding and to obtain the payload at the decoding.

In a preferred embodiment, the signature of the local neighborhood is obtained from parameter values of a parametric model fitted to the local neighborhood.

According to a particular embodiment, the method further comprises computing a fitting score for the at least one vertex among the plurality of vertices; selecting the vertex with a highest fitting score; and applying computing and obtaining steps to the selected vertex. According to a variant of the particular embodiment, the method comprises selecting a set of vertices of the three-dimensional object whose fitting score is higher than a fitting threshold.

In a third aspect, a three-dimensional object resulting from the watermarking method is disclosed.

In a fourth aspect, a device for watermarking a three-dimensional object is disclosed. The device comprises at least one processor configured to implement the above method. Besides, a device for watermarking a three-dimensional object comprising means for implementing the above method is also disclosed.

In a fifth aspect, a device for obtaining a payload from a three-dimensional object is disclosed. The device comprises at least one processor configured to implement the disclosed method. Besides, a device for obtaining a payload from a three-dimensional object comprising means for implementing the above method is disclosed.

In a sixth aspect, a computer program product is disclosed which comprises program code instructions to execute the steps of the methods, according to any of the embodiments and variants, when this program is executed on a computer.

In a seventh aspect, a processor readable medium is disclosed, which has stored therein instructions for causing a processor to perform at least the steps of the disclosed methods, according to any of the embodiments and variants.

While not explicitly described, the present embodiments may be employed in any combination or sub-combination. For example, the present principles are not limited to the described devices.

Besides, any characteristic or variant described for the method inserting or the method for obtaining the features is compatible with a device intended to process the disclosed method and with a computer-readable storage medium storing program instructions.

BRIEF DESCRIPTION OF THE DRAWINGS

Other characteristics and advantages of the present principles will appear through the description of a non-limiting embodiments, which will be illustrated, with the help of the enclosed drawings.

DETAILED DESCRIPTION OF PREFERRED EMBODIMENTS

Figure 1:
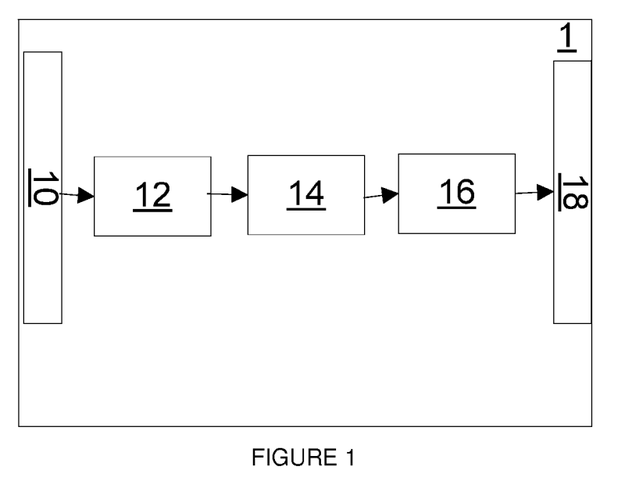
FIG. 1 illustrates a processing device implementing the watermarking method according to a particular embodiment.

FIG. 1 depicts a processing device 1 for watermarking a three-dimensional object according to a specific and non-limitative embodiment of the present principles. The processing device 1 comprises an input 10 configured to receive a 3D object. Meshes are assumed to be piecewise-linear approximations of the surface boundary of 3D objects. They are formally defined by a set of vertices V, a set of edges E and a set of facets F. 3D watermarking methods focus on the common triangle mesh representation. As such, the three-dimensional object or its representation comprises a plurality of vertices. Besides, a local neighborhood of a current vertex comprises the current vertex and at least one other vertex close to the current vertex. According to different embodiments, the source belongs to a set comprising:
  a local memory, e.g. a video memory, a RAM, a flash memory, a hard disk;
  a storage interface, e.g. an interface with a mass storage, a ROM, an optical disc or a magnetic support;
  a communication interface, e.g. a wired interface (for example a bus interface, a wide area network interface, a local area network interface) or a wireless interface (such as a IEEE 802.11 interface or a Bluetooth interface); and
  a shape capturing circuit e.g. 3D scanner.

The input 10 is linked to a module 12 configured to compute an original signature of a local neighborhood of a current vertex among the plurality of vertices. The extraction of the signature is described hereafter with the methods with more details. The module 14 is then configured for obtaining a target signature from the original signature, a secret key and a watermark payload. The module 16 is then configured to modify the local neighborhood of the current vertex so that a position of at least one vertex of the local neighborhood is modified wherein the modified signature of the modified local neighborhood is close to the target signature and so that at least one vertex of the local neighborhood is not modified. The module 16 is linked to an output 18. The watermarked 3D object can be stored in a memory. As an example, the 3D object is stored in a remote or in a local memory, e.g. a video memory or a RAM, a hard disk. In a variant, the 3D object is sent to a receiver by means of a storage interface, e.g. an interface with a mass storage, a ROM, a flash memory, an optical disc or a magnetic storage and/or transmitted over a communication interface, e.g. an interface to a point-to-point link, a communication bus, a point to multipoint link or a broadcast network. In another variant, the 3D object is printed.

Figure 2:
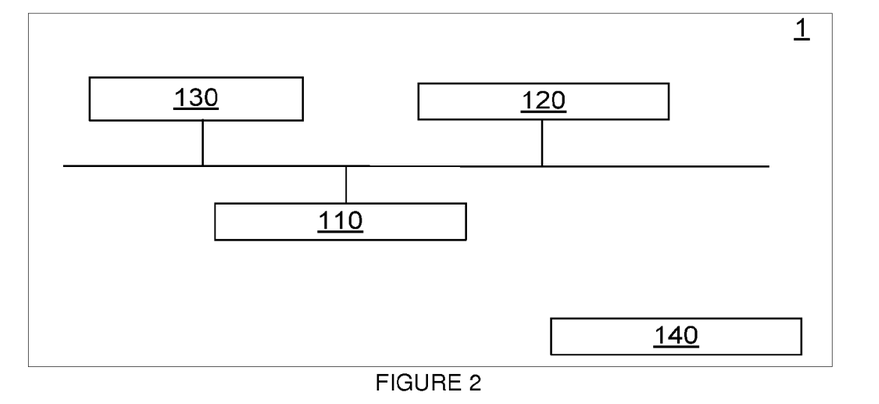
FIG. 2 illustrates an exemplary architecture of the processing device of FIG. 1, according to a specific and non-limitative embodiment.

FIG. 2 represents an exemplary architecture of the processing device 1 according to a specific and non-limitative embodiment of the present principles. The processing device 1 comprises one or more processor(s) 110, which is(are), for example, a CPU, a GPU and/or a DSP (English acronym of Digital Signal Processor), along with internal memory 120 (e.g. RAM, ROM, EPROM). The processing device 1 comprises one or several Input/Output interface(s) 130 adapted to display output information and/or allow a user entering commands and/or data (e.g. a keyboard, a mouse, a touchpad, a webcam, a display); and a power source 140 which may be external to the processing device 1. The processing device 1 may also comprise network interface(s) (not shown). According to an exemplary and non-limitative embodiment of the present principles, the processing device 1 further comprises a computer program stored in the memory 120. The computer program comprises instructions which, when executed by the processing device 1, in particular by the processor 110, make the processing device 1 carry out the processing method described in FIG. 6. According to a variant, the computer program is stored externally to the processing device 1 on a non-transitory digital data support, e.g. on an external storage medium such as a HDD, CD-ROM, DVD, a read-only and/or DVD drive and/or a DVD Read/Write drive, all known in the art. The processing device 1 thus comprises an interface to read the computer program. Further, the processing device 1 could access one or more Universal Serial Bus (USB)-type storage devices (e.g., "memory sticks.") through corresponding USB ports (not shown).

According to exemplary and non-limitative embodiments, the processing device 1 is a device, which belongs to a set comprising:
  a mobile device;
  a communication device;
  a game device;
  a tablet (or tablet computer);
  a laptop (or desktop);
  a 3D scanner;
  a motion capture device;
  an encoding chip;
  a decoding chip;
  a 3D mesh server;
  a 3D mesh sharing platform.

Figure 3:
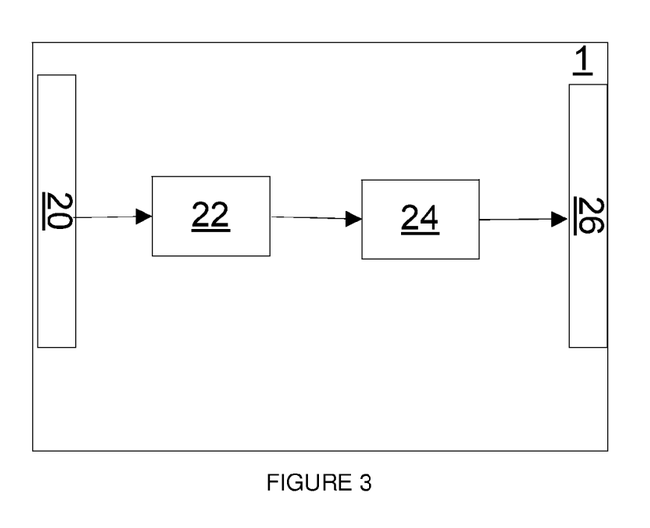
FIG. 3 illustrates a processing device implementing the obtaining method according to a particular embodiment.

FIG. 3 depicts a processing device 2 for obtaining or retrieving such watermark payload from a three-dimensional object according to a specific and non-limitative embodiment of the present principles. The processing device 2 comprises an input 20 configured to receive a 3D object from a source. In the common mesh representation, the three-dimensional object comprises a plurality of vertices. According to different embodiments, the source belongs to a set comprising:
  a local memory, e.g. a video memory, a RAM, a flash memory, a hard disk;
  a storage interface, e.g. an interface with a mass storage, a ROM, an optical disc or a magnetic support;
  a communication interface, e.g. a wired interface (for example a bus interface, a wide area network interface, a local area network interface) or a wireless interface (such as a IEEE 802.11 interface or a Bluetooth interface); and
  a shape capturing circuit e.g. 3D scanner.

The input 20 is linked to a module 22 configured to compute the signature of a local neighborhood of a vertex of the three-dimensional object as later on described. The module 24 is then configured to obtain the watermark payload from the signature and secret key. The module 24 is linked to an output 26. The 3D object and the extracted payload can be stored in a memory. As an example, the 3D object is stored in a remote or in a local memory, e.g. a video memory or a RAM, a hard disk. In a variant, the 3D object and associated payload are sent to a rendering device by means of a storage interface, e.g. an interface with a mass storage, a ROM, a flash memory, an optical disc or a magnetic storage and/or transmitted over a communication interface, e.g. an interface to a point-to-point link, a communication bus, a point to multipoint link or a broadcast network.

Figure 4:
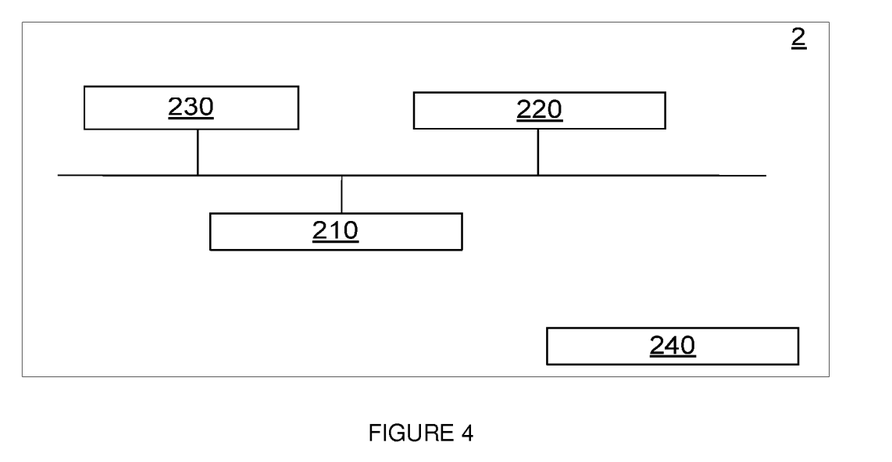
FIG. 4 illustrates an exemplary architecture of the processing device of FIG. 3, according to a specific and non-limitative embodiment.

FIG. 4 represents an exemplary architecture of the device 2 according to a specific and non-limitative embodiment of the present principles. The processing device 2 comprises one or more processor(s) 210, which is(are), for example, a CPU, a GPU and/or a DSP (English acronym of Digital Signal Processor), along with internal memory 220 (e.g. RAM, ROM, EPROM). The processing device 2 comprises one or several Input/Output interface(s) 230 adapted to display output information and/or allow a user entering commands and/or data (e.g. a keyboard, a mouse, a touchpad, a webcam, a display); and a power source 240 which may be external to the processing device 2. The processing device 2 may also comprise network interface(s) (not shown). According to an exemplary and non-limitative embodiment, the processing device 2 further comprises a computer program stored in the memory 220. The computer program comprises instructions which, when executed by the processing device 2, in particular by the processor 220, make the processing device 2 carry out the processing method described in FIG. 7. According to a variant, the computer program is stored externally to the processing device 2 on a non-transitory digital data support, e.g. on an external storage medium such as a HDD, CD-ROM, DVD, a read-only and/or DVD drive and/or a DVD Read/Write drive, all known in the art. The processing device 2 thus comprises an interface to read the computer program. Further, the processing device 2 could access one or more Universal Serial Bus (USB)-type storage devices (e.g., "memory sticks.") through corresponding USB ports (not shown).

According to exemplary and non-limitative embodiments, the processing device 2 is a device, which belongs to a set comprising:
 a mobile device;
 a communication device;
 a game device;
 a tablet (or tablet computer);
 a laptop (or desktop);
 a 3D printer;
 an encoding chip;
 a decoding chip;
 a 3D mesh server;
 a 3D mesh sharing platform.

Figure 5:
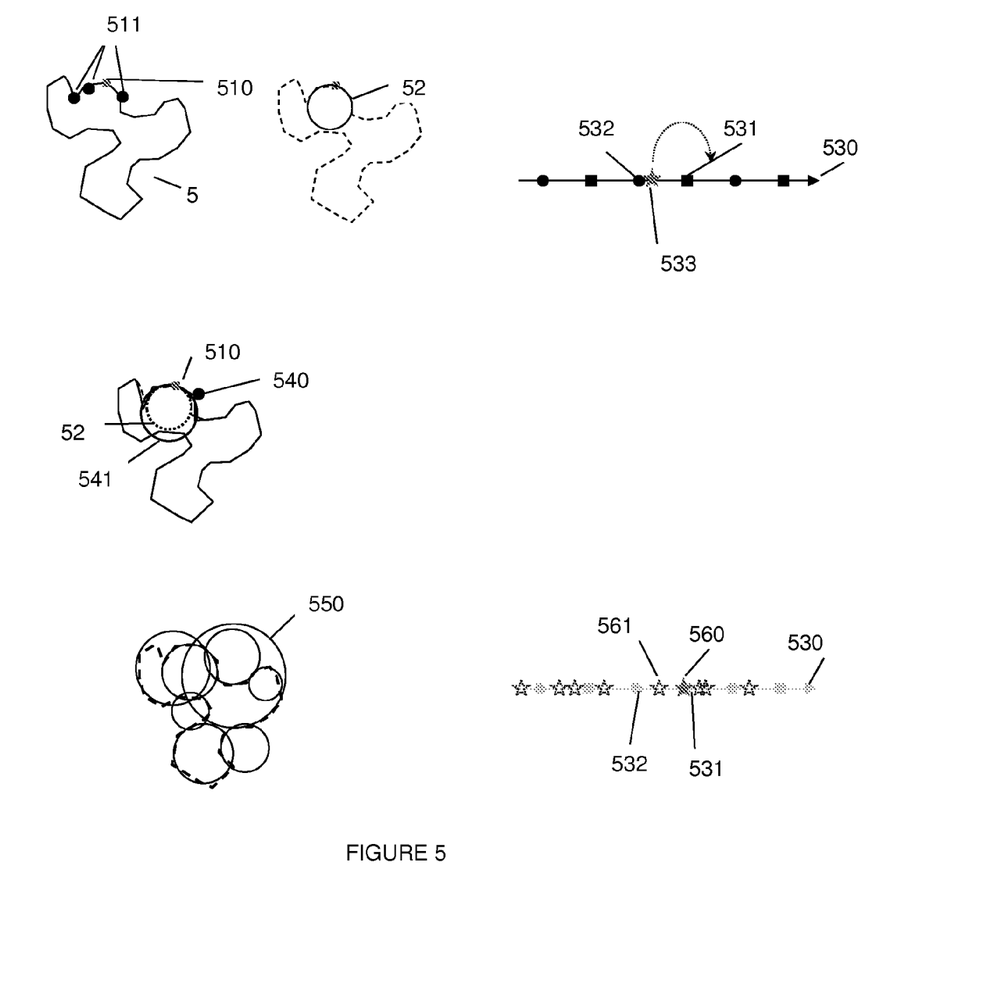
FIG. 5 illustrates a 3D object undergoing the watermarking and obtaining method according to a particular embodiment.

FIG. 5 illustrates a 3D object 5 undergoing the watermarking and the obtaining payload method according to a specific and non-limitative embodiment of the present principles. Without loss of generality, the process is exemplified in 2D for clarity. A point or vertex 510 is selected on the 3D object 5. Advantageously any vertex on the 3D object may be selected with no special consideration of the location of the vertex. Along with the vertex 510, its local neighborhood comprising other vertices 511 close to the vertex 510 is considered. The local neighborhood is often referred to as small surface patch. According to a first variant, the local neighborhood comprises vertices on a r-ring around the selected vertex, typically a 1-ring or 2-ring. According to a second variant, the local neighborhood comprises vertices whose geodesic distance from the selected vertex is lower than a threshold. In a preferred embodiment, the signature of the local neighborhood is computed from a parametric model, such as the non-limitative example of a sphere 52 characterized by its radius. According to another non-limitative example, the geometric model is a paraboloid or an ellipsoid. The parametric model is then fitted to the local neighborhood around the selected vertex 510 of the 3D object. Advantageously, the size of the local neighborhood is adjusted depending on the considered parametric model. For instance, to fit a sphere in 3D, at least 4 non-coplanar points are needed. In contrast, a paraboloid variant requires at least 6 non-coplanar points. In the variant using the r-ring, care should be taken so that the number of vertices used for fitting the parametric model is no too small e.g. less than 4 or 6. Thus a 2-ring is a preferred r-ring variant while in the variant of the geodesic distance, the threshold is determined so as to include at least a specified number of vertices. The parameter values of the parametric model, such as the radius in case of a sphere, are determined and combined to compute the original signature 533 of the vertex. Such original signature 533 belongs to a signature space 530. In the described non-limitative example, this signature space 530 is the 1-D scalar axis but it could be multi-dimensional in general. A watermarking subspace is defined corresponding to quantization grids associated to different watermark payloads. For security, these quantization grids are offset by a secret dither in practice so that individuals without the secret key do not know the location of the quantization points. The target signature which encodes the desired watermark payload (circle 532 for payload 0 vs. square 531 for payload 1) and which is the closest to the original signature 533 is identified. In the general multidimensional case, multi-dimensional quantization using nested lattices can be used to embed more than a single payload bit. Then, the positions of some vertices 540 in the local neighborhood of the vertex 510 are modified so that the modified signature (corresponding to the circle 541 instead of 52) output by the parametric model fitting algorithm is now close to the target signature 531 or 532. Advantageously, the modification of the local neighborhood leaves at least one vertex untouched, for instance the selected vertex 510, in order to be able to exploit such unaltered vertices to convey additional information. To preserve the fidelity of the underlying 3D object carrying the watermark, this fitting process should also minimize the watermark embedding 3D distortion. Advantageously, this implies that the vertices of the local neighborhood do not need to be exactly placed on the target parametric model but can be slightly off as long as the associated modified signature is close to the target one.

On the receiver side, the signature of all the vertices of the object are computed based on their local neighborhood. For instance, the parametric model, here the sphere 550, is fitted using a local neighborhood for all the vertices of the object (only a subset depicted for clarity) and the parameter values, here the radius, are recorded. In the signature space 530, the computed signatures 560, 561 span a wide range of locations. However, statistically, few of them are lying close to the secret quantization points 531, 532 used at embedding. As a result, among the computed signatures 560, 561, the ones which are the closest to the quantization grid are obtained and their associated payload is extracted (0 for circle 532, 1 for square 531). In the described non-limitative example, the signature 560 is retained and the payload 1 extracted.

Figure 6:
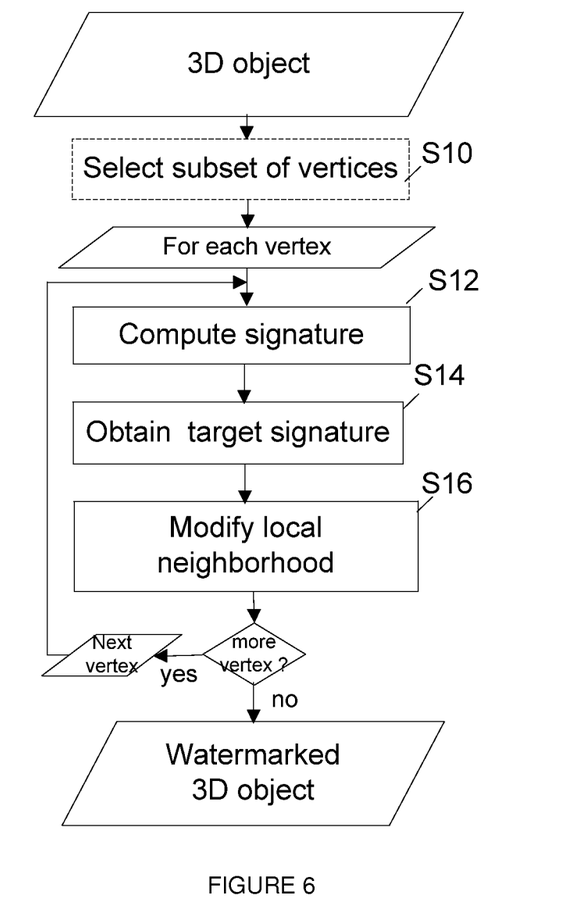
FIG. 6 illustrates a flowchart of the method for watermarking a 3D object according to a preferred embodiment.

FIG. 6 illustrates a flowchart of the method for watermarking a 3D object according to a preferred embodiment. The steps of the method are also described with the 3D object 5 of FIG. 5.

In a preliminary step (not represented), the watermark signature subspace of the signature space 530 is identified for a local parametric model using a secret key. This will serve as the underlying convention of the watermarking communications channel. In FIG. 5, this watermark signature subspace corresponds to a set of quantization points (531, 532) in the signature space, each quantization point being associated to a watermark payload. As such, the watermark signature subspace can be further partitioned based on the watermark payload associated to the quantization points so that each element of the partition contains quantization points associated to the same watermark payload. In a first variant, each component (aka. each parameter value) composing the signature is quantized independently. The quantization can be uniform to yield quantization values regularly placed along the scalar axis. Alternately, the quantization may be non-uniform, e.g. logarithmic, to better accommodate for the natural distribution of the parameter values in the signature. In a second variant, all components of the signature are quantized at once e.g. using interlaced lattices to perform vector quantization. Again, the quantization can be uniform or not.

In an optional preliminary step S10, a subset of vertices on the surface of the 3D mesh is selected. The vertices are either selected by a user or (pseudo-)randomly chosen on the mesh. Advantageously, the vertices are independent, meaning that their local neighborhoods do not overlap. In the 2-ring variant, from a set of user-specified vertices, a subset of vertices is built incrementally by adding a vertex, one at a time, whose 2-ring neighborhood does not overlap with the 2-ring neighborhoods of previously chosen vertices. For instance, vertices are enumerated in a random order and kept if they do not overlap with a previous ones. In a variant, the subset of vertices is constructed by iteratively adding a farthest point on the surface, e.g. based on the geodesic distance, and starting with a single random location.

Then the following steps of the watermarking method are repeated for each vertex, called current vertex, of the selected subset. Advantageously, the same payload is repeatedly embedded in the local neighborhoods of the 3D vertices of the selected subset, thereby improving the robustness to cropping attack.

In a step S12, for a current vertex, a signature characterizing the local neighborhood is computed. To compute such signature, a parametric model (also called local geometric model) is fitted to the local neighborhood around this current vertex. In the embodiment illustrated on FIG. 5, we consider a parametric model based on sphere fitting. However in a preferred embodiment of the present principles, we consider a parametric model based on paraboloid fitting. The paraboloid model is parameterized by six coefficients (a, b, c, d, e, f) according to the equation $z=a \cdot x^2+b \cdot y^2+c \cdot x \cdot y+d \cdot x+e \cdot y+f$ where (x, y, z) are the coordinates of a point on the surface of the paraboloid. The six model parameters are combined to define two model characteristics similar to the one disclosed by I. Sipiran and B. Bustos in "*Harris 3D: a robust extension of the Harris operator for interest point detection on 3D meshes*" (in The Visual Computer: International Journal of Computer Graphics, vol. 27, no. 11, pp. 963-976, 2011).

$$\left( \frac{a^2 + 2b^2}{|a+c|^2}, \frac{c^2 + 2b^2}{|a+c|^2} \right)$$

Advantageously, those two model characteristics composing the so-called vertex signature are invariant to rigid transforms and scaling The characteristic subspace for the paraboloid model corresponds to sets of quantized values (531, 532) for each one of the two model characteristics. In a variant, the local model is more generally defined as a bivariate polynomial with a larger degree, e.g., degree 3 instead of 2, and written in canonical form by F. Cazals and P. Marc in "*Estimating Differential Quantities Using Polynomial Fitting of Osculating Jets*" (in Proceedings of the 2003 Eurographics/ACM SIGGRAPH Symposium on Geometry Processing, 2003). Thus, according to a preferred embodiment, a paraboloid model is fitted using the vertices of the 2-ring neighborhood of the current vertex, and the two characteristics of the model are computed using the estimated parameters of the fitted model.

In a step S14, a target signature belonging to the previously defined secret subspace of the signature is obtained using the original signature 533 and the watermark payload value. More precisely, the signature 531 which belongs to the signature subspace associated to the desired payload (here 0), and which is the closest to the original signature 533 according to some metric is identified. In a variant, the metric is the Euclidean distance in the signature space. In another variant, the metric incorporates some perceptual components to better account for the human perceptual system.

In a step S16, the local neighborhood of the current vertex is modified according to two constraints. First, the positions of some of the vertices of local neighborhood are modified so that the signature computed from the parameters of the parametric model fitted to the modified neighborhood matches the identified target signature. Second, at least a vertex, typically the current vertex, is not modified. Advantageously, this allows to exploit these unaltered vertices to convey additional information. Moreover, these modifications to the vertices of the local neighborhood should minimize the distortion induced onto the mesh as in any watermarking algorithm. According to an advantageous variant, a constraint optimization solver is used in order to find the new vertex locations within their 2-ring neighborhoods, so that: (i) the modified signature obtained from the modified neighborhood matches the target one, (ii) at least a vertex of the local neighborhood of the current vertex is not modified; and (iii) the distortion induced by the vertex relocation process is minimal according to the squared error metric. In a variant, the distortion is measured with a perceptual metric (MSDM) instead of the squared error metric in order to better capture distortion as perceived by humans. In another variant, the solver relocates the vertices so that the distance between the modified signature and the target one is smaller than a specified threshold (alpha embedding).

As previously exposed, once the landmark point has been created at the current vertex location, the embedding process is repeated for another vertex of the subset of selected vertices.

In a further refinement, landmarks are defined using nested local neighborhood in which fitting parameters are sequentially modified. Advantageously, this nesting process enlarges the dimensionality of the signature space of the current vertex and thereby allow to embed larger watermark payload, i.e. more watermark bits. The nested landmark creation starts by applying the watermarking method in a first local neighborhood, typically a 2-ring neighborhood. Subsequently, the signature is computed for a second local neighborhood, typically a 3-ring neighborhood centered on the same current vertex. The locations of the vertices in the 3-ring neighborhood but not in the 2-ring neighborhood are then altered to match a second target signature. This last restriction prevents any interference between the two nested embedding. In a variant, the target signatures for these two steps are defined according to different payload bits, rather than the same ones.

Figure 7:
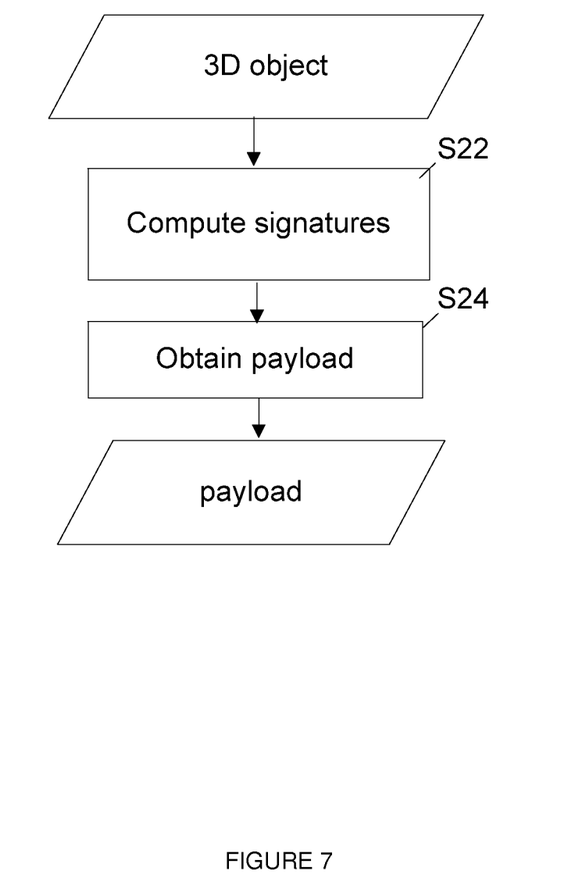
FIG. 7 illustrates a flowchart of the method for obtaining payload from a 3D object according to a preferred embodiment.

FIG. 7 illustrates a flowchart of the method for obtaining a payload from a 3D object according to a preferred embodiment. The steps of the method are described using the watermarked 3D object of FIG. 5. In case of sequential embedding on a plurality of selected vertices, at the receiver end, the following steps of the watermark detection method are repeated for all mesh vertices and the different extracted payload combined, e.g. with a majority vote.

In a step S22, a signature of the local neighborhood is computed for all vertices of a 3D mesh. To that end, the local parametric model is fitted onto the local neighborhood of the processed vertex, e.g. the 2-ring neighborhood. The signature characterizing the local neighborhood is then computing from the parameter values of the fitted parametric model as disclosed for the embedding method.

Then in a step S24, the payload is obtained from the signatures. To begin with, each vertex is tested to check whether it carries watermark information or not. To that end, the vertices whose signatures are the closest to any of the quantization points defining the secret signature subspace are identified. In a variant, a fixed number of vertices is retained. In another variant, only the vertices whose signature distance to the secret signature subspace are below a specified threshold are kept. Then, for each of such identified vertex, the watermark payload associated to the quantization point of the watermark signature subspace that is the closest to the current signature is recovered. Finally, the watermark message is obtained by aggregating watermark information collected from all identified vertices. According to a variant, a majority vote is used to estimate the embedded payload from the recovered watermark payloads with each of the identified vertex. In another variant, the aggregation function is not a majority vote but a vote weighted by some score, e.g. the distance to the nearest quantization point for each selected vertex (soft decoding).

In the variant of the preferred embodiment based on paraboloid using nested neighborhoods, in order to recover the payload, the signature composed of 2 model characteristics is computed for all the mesh vertices using first the 2-ring neighborhood, and then the 3-ring neighborhood. The vertices carrying watermark information correspond to vertices whose combined signatures (2 times 2 model characteristics) are the closest to the watermark signature subspace (4 dimensions). For each identified vertex, the watermark information is recovered by combining the information from the first and second sets of model characteristics.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a Blu-ray, a DVD often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one skilled in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for watermarking a three-dimensional object comprising:
    Computing a shape descriptor of a local neighborhood of a current vertex among a plurality of vertices representing said three-dimensional object, wherein said local neighborhood comprises said current vertex and at least one other vertex;
    Obtaining a target shape descriptor from said shape descriptor using a quantization grid associated with a watermark payload;
    Modifying said local neighborhood wherein a position of at least one vertex of said local neighborhood is modified such that a shape descriptor of said modified local neighborhood is close to said target shape descriptor and such that said current vertex is not modified.

2. The method according to claim 1 wherein said local neighborhood comprises vertices in a two ring around said current vertex.

3. The method according to claim 1 wherein said local neighborhood comprises vertices whose geodesic distance from said current vertex is lower than a threshold.

4. The method according to claim 1 wherein said shape descriptor of said local neighborhood is obtained from parameter values of a parametric model fitted to said local neighborhood.

5. The method according to claim 4 wherein said parametric model is a paraboloid and wherein said shape descriptor comprises a function of coefficients of said parametric model.

6. The method according to claim 4 wherein modifying said local neighborhood comprises adding a displacement to said position of said at least one vertex, said displacement being such that said shape descriptor of said modified local neighborhood is close to said target shape descriptor while minimizing distortion.

7. The method according to claim 1 further comprising:
Applying steps of computing a shape descriptor, obtaining a target shape descriptor and modifying said local neighborhood to a first local neighborhood of said current vertex;
Applying steps of computing a shape descriptor, obtaining a target shape descriptor and modifying said local neighborhood to a second local neighborhood of said current vertex, wherein modifying said second local neighborhood further comprises not modifying all vertices of said second local neighborhood belonging to said first local.

8. The method according to claim 1 further comprising selecting a set of current vertices of said three-dimensional object whose local neighborhoods do not overlap and wherein steps are applied to each current vertex.

9. A device for watermarking a three-dimensional object comprising at least one processor configured to:
Compute a shape descriptor of a local neighborhood of a current vertex among a plurality of vertices representing said three-dimensional object, wherein said local neighborhood comprises said current vertex and at least one vertex;
Obtain a target shape descriptor by quantizing said shape descriptor using a quantization grid associated with a watermark payload;
Modify said local neighborhood wherein a position of at least one vertex of said local neighborhood is modified such that a shape descriptor of said modified local neighborhood is close to said target shape descriptor and such that said current vertex of said local neighborhood is not modified.

10. The device according to claim 9 wherein said local neighborhood comprises vertices in a two ring around said current vertex.

11. The device according to claim 9 wherein said local neighborhood comprises vertices whose geodesic distance from said current vertex is lower than a threshold.

12. The device according to claim 9 wherein said shape descriptor of said local neighborhood is obtained from parameter values of a parametric model fitted to said local neighborhood.

13. The device according to claim 12 wherein said parametric model is a paraboloid and wherein said shape descriptor comprises a function of coefficients of said parametric model.

14. The device according to claim 12 wherein modifying said local neighborhood comprises adding a displacement to said position of said at least one vertex, said displacement being such that said shape descriptor of said modified local neighborhood is close to said target shape descriptor while minimizing distortion.

15. The device according to claim 9 wherein the least one processor is configured to:
Compute a shape descriptor, obtain a target shape descriptor and modify said local neighborhood of a first local neighborhood of said current vertex;
And iterate compute a shape descriptor, obtain a target shape descriptor and modify said local neighborhood of a second local neighborhood of said current vertex, wherein at least all vertices of said second local neighborhood belonging to said first local neighborhood are not modified.

16. The device according to claim 9 wherein the least one processor is configured to select a set of current vertices of said three-dimensional object whose local neighborhoods do not overlap.

17. A non-transitory program storage device, readable by a computer, tangibly embodying a program of instructions executable by the computer to perform a method comprising:
Computing a shape descriptor of a local neighborhood of a current vertex among the plurality of vertices representing a three dimensional object, wherein said local neighborhood comprises said current vertex and at least one other vertex;
Obtaining a target shape descriptor from said shape descriptor using a quantization grid associated with a watermark payload;
Modifying said local neighborhood wherein a position of at least one vertex of said local neighborhood is modified such that a shape descriptor of said modified local neighborhood is close to said target shape descriptor and such that said current vertex is not modified.

* * * * *